July 23, 1957 T. M. DEAKIN 2,800,124
DIAMOND TRUING DEVICES
Filed June 20, 1955 8 Sheets-Sheet 1
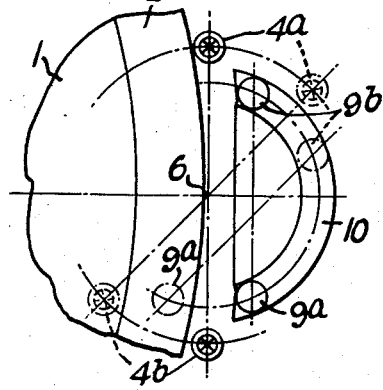
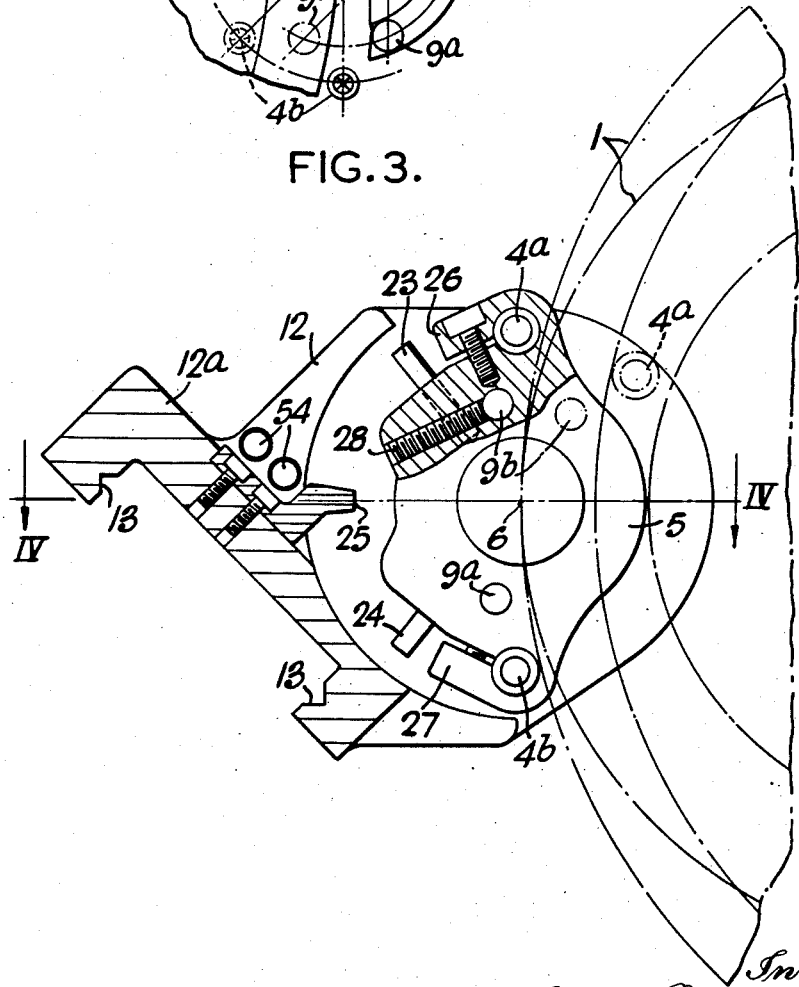
Inventor
Thomas Meyrick Deakin
By Karl W. Flocks
Attorney July 23, 1957
T. M. DEAKIN
2,800,124
DIAMOND TRUING DEVICES
Filed June 20, 1955
8 Sheets-Sheet 2
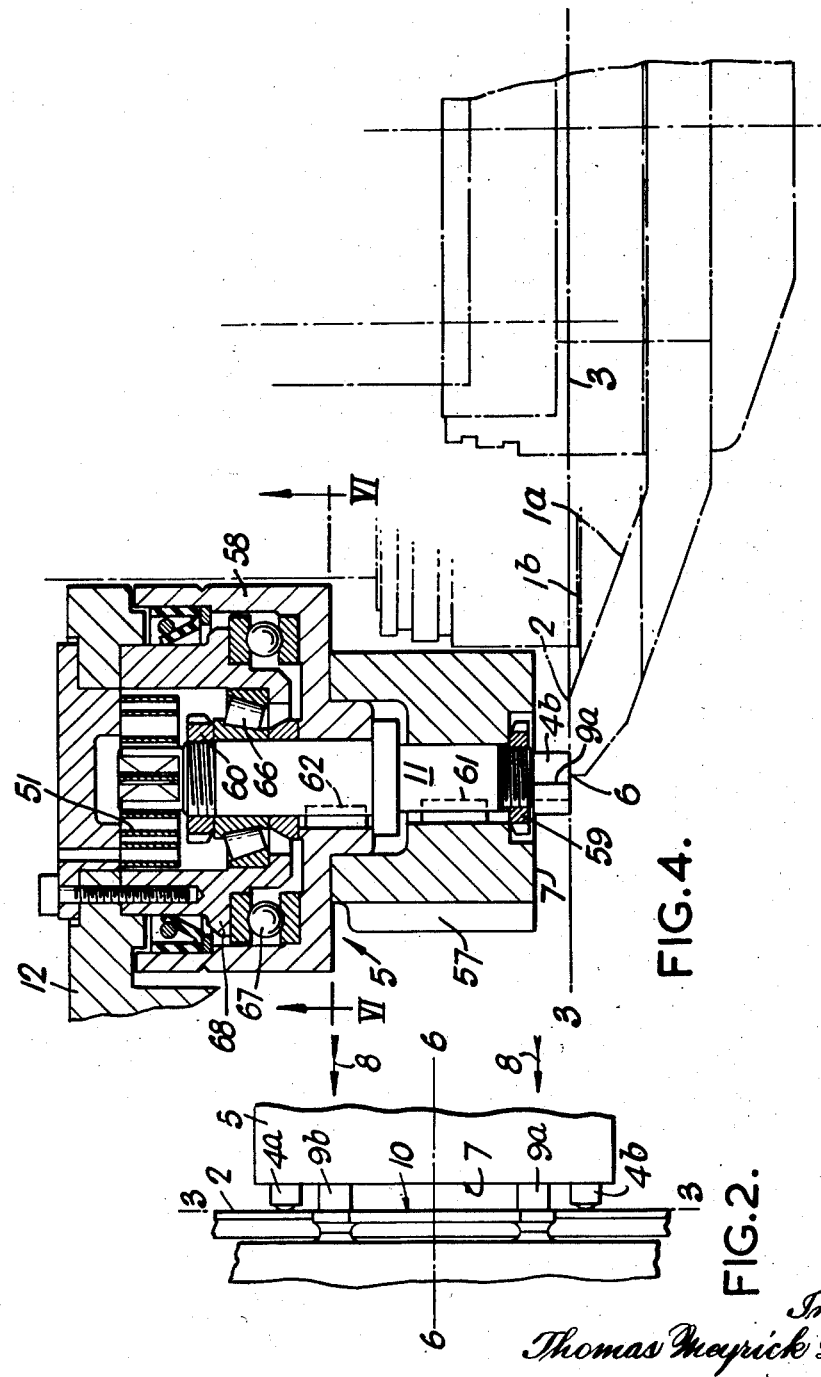

July 23, 1957 T. M. DEAKIN 2,800,124
DIAMOND TRUING DEVICES
Filed June 20, 1955 8 Sheets-Sheet 3
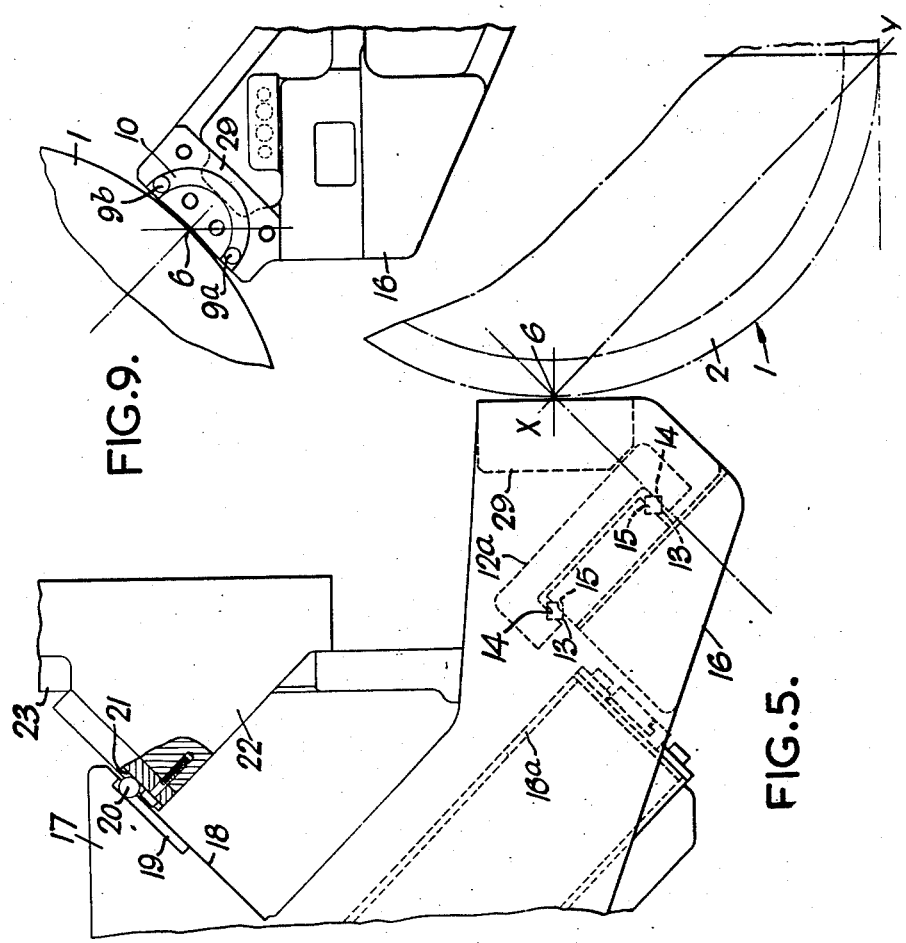
Inventor
Thomas Meyrick Deakin
By Karl W. Flocks
Attorney

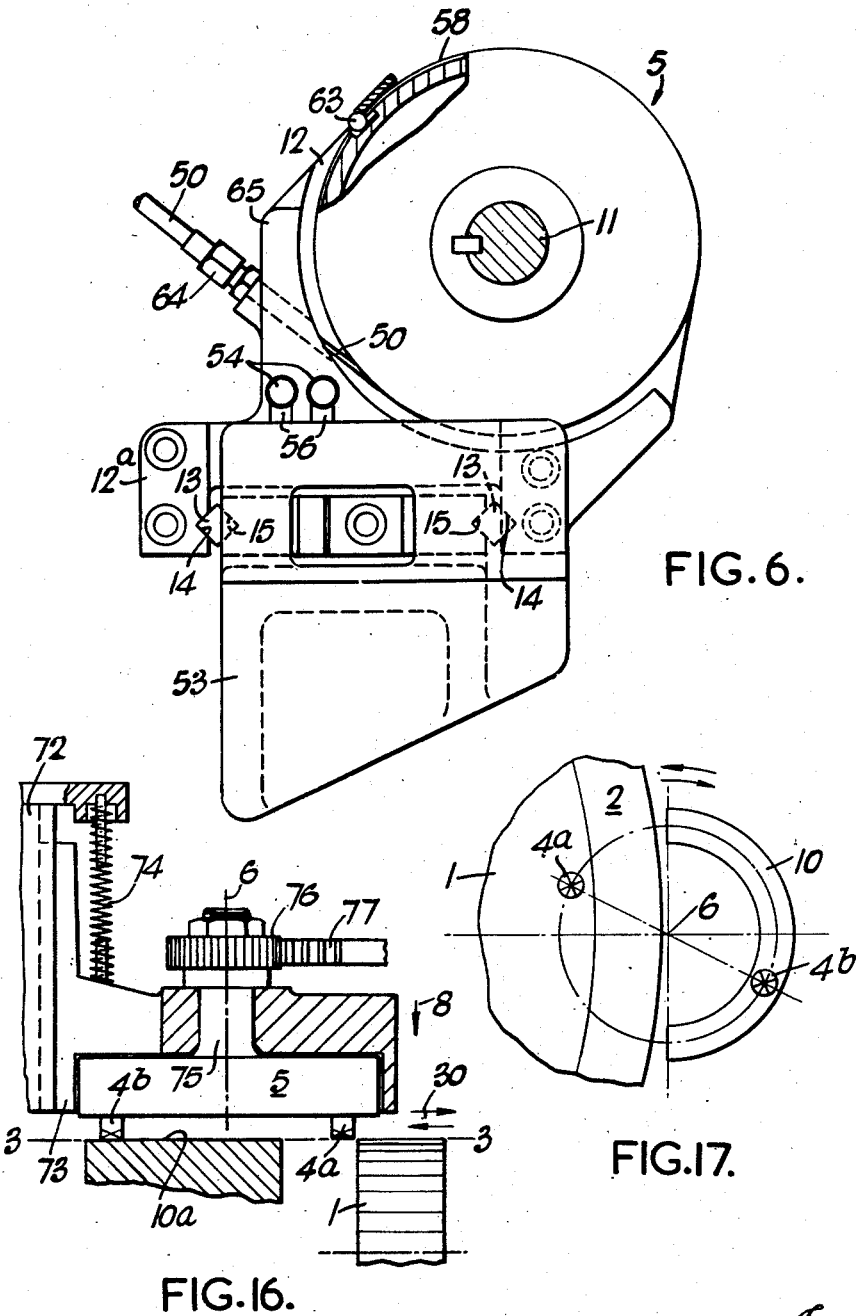

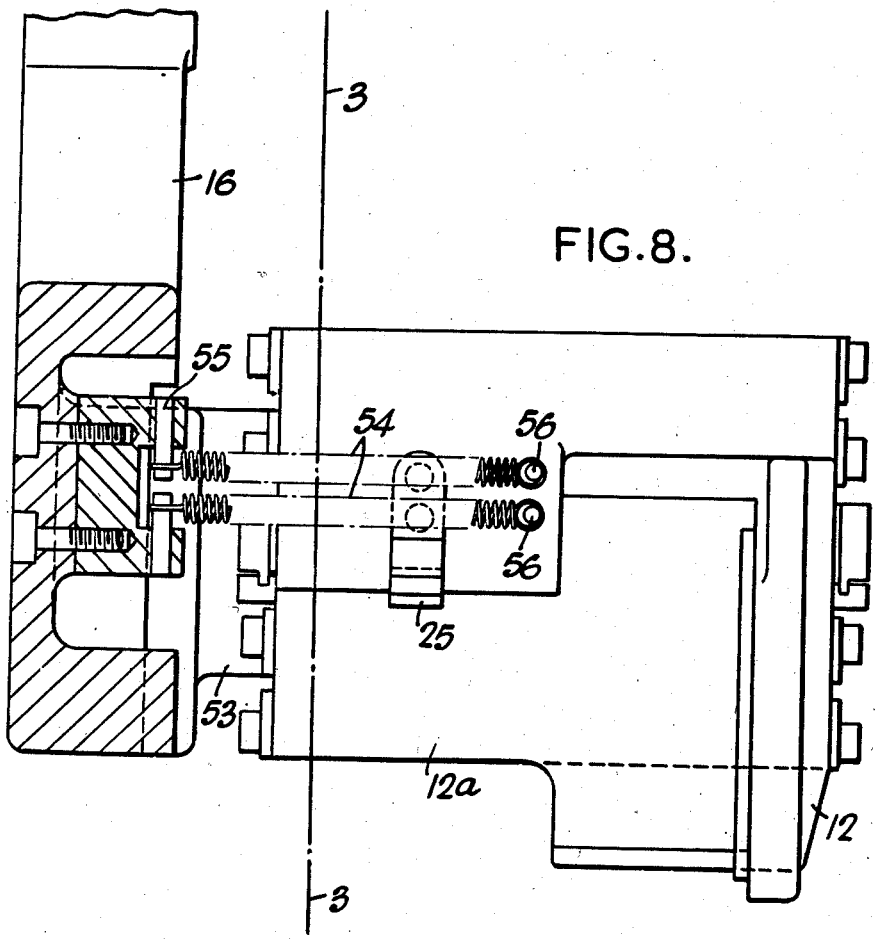

July 23, 1957 T. M. DEAKIN 2,800,124
DIAMOND TRUING DEVICES
Filed June 20, 1955 8 Sheets-Sheet 7

Inventor
Thomas Meyrick Deakin
By Karl W. Flocks
Attorney

July 23, 1957 T. M. DEAKIN 2,800,124
DIAMOND TRUING DEVICES
Filed June 20, 1955 8 Sheets-Sheet 8

Inventor
Thomas Meyrick Deakin
By Karl W. Flocks
Attorney

2,800,124

DIAMOND TRUING DEVICES

Thomas Meyrick Deakin, London, England

Application June 20, 1955, Serial No. 516,453

Claims priority, application Great Britain June 21, 1954

21 Claims. (Cl. 125—11)

This invention concerns diamond truing devices, primarily for truing the working surfaces of grinding wheels, and has for an object to provide a simple construction which also permits of a high degree of accuracy of positioning of the diamond tool. Although it is sometimes customary to employ actual diamonds for truing grinding wheels, the term "diamond" in this specification is to be understood as including any material of a hardness suitable for such truing purposes. Furthermore, a diamond tool is to be understood as not only including a single diamond mounted in a suitable support, but also a diamond grit impregnated support as is commonly used for the purpose of truing grinding wheels.

In many precision grinding machines, it is required not only to maintain the working face of the wheel truly cylindrical or conical with respect to its axis of rotation, or truly flat and normal to its axis, but also to ensure that the trued surface is maintained tangential to, or lying in, a reference plane which is a fixed datum in the design and construction of the machine, although it may not necessarily by physically represented by a component part of the machine. The present invention aims at ensuring that the cutting point or edge of the truing tool is always located in this datum plane irrespective of the amount of wear which takes place on the truing tool itself.

Broadly stated, the invention resides in locating the working tip of a diamond truing tool during a truing stroke by keeping another tool in contact with a locating surface of a fixed register member adjacent the wheel, the said surface defining a datum plane to which the wheel face is to be trued, the locating tool always being caused to traverse a trued zone of the wheel face between one locating function and the next so that automatic compensation is made for diamond tool wear. Thus there must always be at least two tools—at least one of which is a diamond tool—and preferably there are two locating tools which are alternately operative to perform the locating function whilst the other is being machined.

Each diamond tool may itself constitute the locating tool for the other tool in the same carrier while the said other tool is executing its truing stroke. It is in general preferred, however, to keep the functions of locating the truing tool and truing the wheel face separate by providing at least a pair of rigid locating tools of a hard material capable of being machined by the wheel and each associated with a diamond truing tool in such a manner that, as the said truing tool engages the fixed datum surface of a fixed register plate or like rigid member, the other locating tool is engaged by the wheel surface over a zone which has just been trued by the operative tool.

By this latter construction, a diamond truing tool, as it trues the wheel, has its working tip accurately located in space by the engagement with a fixed surface, representing the datum plane, of a locating tool whose operative tip has previously been ground by the wheel immediately after truing by the other tool. Thus, provided that the diamond tool or tools and the locating tool or tools are accurately set before truing commences, the working tip of the truing tool must always be located on the datum plane. Furthermore, as the diamond tool itself wears, the adjacent locating tool which will be operative on the next truing stroke to perform its locating function has its operative surface machined away by the amount of this wear, so that before the next truing stroke the carrier is advanced into the wheel by this amount. Since where two diamond tools are alternately operative, they will normally wear by equal amounts, the working tip of each diamond tool will be advanced to restore it to the datum plane.

The invention whose scope is defined in the appended claims, can be carried into effect in various ways, some of which will now be particularly described, by way of example only, with reference to the accompanying drawings in which:

Figure 1 is a schematic elevation layout of a device having a pair of tools for truing a plane face of a vertical wheel;

Figure 2 is a fragmentary plan of Figure 1;

Figure 3 is a part-sectional elevation of the tool carrier;

Figure 4 is a section on the line IV—IV of Figure 3;

Figure 5 is a fragmentary elevation of the tool carrier mounting;

Figure 6 is a view on the line VI—VI of Figure 5, showing part of the carrier mounting in end elevation;

Figure 8 is a part-sectional plan of the mounting, the section being taken on the line VIII—VIII of Figure 7;

Figure 9 is an elevation on the arrow IX of Figure 7 showing the register plate in its operative position, the tool carrier mounting being omitted for clarity;

Figures 14 to 16 are schematic layouts of alternative linear traverse assemblies for truing the cylindrical or conical surface of a grinding wheel, and Figure 17 is a schematic layout of a modified rotary assembly for truing a plane wheel face.

Figure 7:
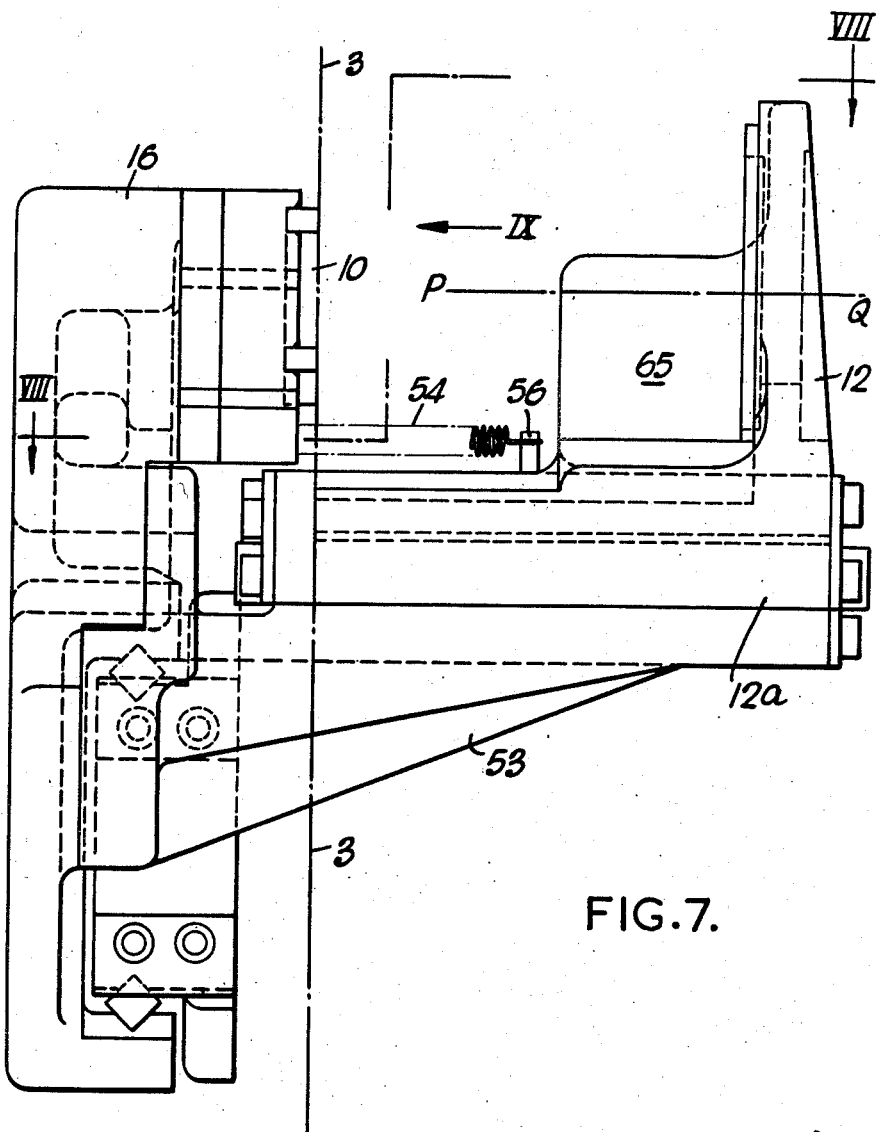
Figure 7 is a side elevation of the carrier mounting.

Referring first to Figures 1 and 2 of the drawings, a grinding wheel 1 has a plane working surface 2 which lies in a datum plane 3 (Figure 2) constituting a fixed reference parameter in a grinding machine. The face 2 is required always to be trued so that it lies in the plane 3. A pair of diamond truing tools 4a, 4b are clamped in the rotary tool carrier 5 which is rotatable about an axis 6 which is normal to the plane 3, the tools 4a and 4b projecting from a flat face 7 of the carrier 5 lying parallel and close to the surface 2 of the grinding wheel. The carrier 5 is biased in the direction of the arrows 8 in Figure 2.

Also clamped in the tool carrier 5 so as to project from the face 7 are a pair of dummy or locating tools or pegs 9a, 9b which are initially set flush with, or slightly proud of, the respective associated tools 4a, 4b. These locating pegs are adapted to bear on a rigid segmental register member or plate 10 whose locating or datum surface is accurately fixed in the datum plane 3 and lies with its ends close to the periphery of the grinding wheel 1 when the latter is located in the truing position (which will normally be displaced by a convenient distance from the work so that the wheel lies well clear of the work). The relative positions of the diamond tools 4a, 4b, the locating tools or pegs 9a, 9b, and the wheel 1 preparatory to a truing operation are shown in Figure 1.

When the face 2 is to be trued, the wheel 1 is fed towards the carrier 5 by the appropriate amount and the carrier 5 is rotated through an angle about the axis 6. The feed of the wheel 1 will bring the face 2 slightly proud of the plane 3, so that rotation of the carrier 5 will bring one of the diamond tools (say, the tool 4b, as shown dotted in Figure 1) into cutting engagement with the wheel. The working tip of the tool 4b is accurately located in the datum plane 3 by the interengagement of the associated locating peg 9b with the segmental register plate 10 against which it is firmly held by the biasing force represented by the arrows 8 of Figure 2.

As an operative tool 4b traverses its working arc across the face 2, the other peg 9a follows it, and if it is set proud of this tool, it will have its locating end face ground back flush with the tool by an already trued zone of the face 2, so that it is correctly set with respect to the plane 3. After the tool 4b has finished its cut, the carrier 5 may be either rotated further in the same direction or reversed to bring the other tool 4a into truing engagement with the wheel 1; or the carrier 5 may merely be returned to its inoperative or zero position, as shown in full lines in Figure 1, ready for the next truing operation.

It is essential that each peg 9a, 9b should be machined by a freshly trued zone of the wheel face 2. In order to ensure this in the oscillatory carrier arrangement illustrated in Figures 1–9, the respective radii through the diamond tools 4a, 4b lead by a small angle on the radii through the adjacent pegs 9b, 9a—taking the direction of rotation of the carrier 5 for feeding in the appropriate diamond tool on a truing stroke in each case as the positive direction. Thus, although for a given direction of rotation of the wheel 1 the order in which the wheel encounters a diamond tool and a peg is reversed between successive truing strokes of the carrier 5, there is a time interval between the contact of a diamond tool with the wheel and the contact of the accompanying peg therewith, so that the latter will always engage a trued zone irrespective of the direction of wheel rotation.

Assuming that each tool is swung to and fro once across the face 2 in a truing operation, the next such operation is carried out by the other tool (4a in the case considered). The working tip of the latter is now located by the peg 9a which bears on the register plate 10. This peg has already itself been accurately ground by the previously trued face 2, and the other peg 9b is now similarly machined, so that the tools 4a, 4b are always located by accurately machined pegs bearing against a fixed register plate in the datum plane, any initial proudness of either peg being automatically corrected during the first truing operation by the adjacent tool.

As the tools 4a, 4b wear, the the trued face 2 of the wheel 1 begins to project slightly beyond the plane 3. When this happens in respect of either diamond tool, the adjacent peg is also machined back by the amount of this error, so that when the other tool is swung across the face 2, the carrier 5 is advanced by exactly the amount of tool wear, the other tool thus having its working tip again accurately located in the datum plane 3. The device is thus self-compensating for tool wear.

Figures 3 to 9 show in greater detail one specific construction of the truing device. The carrier 5 is mounted for oscillation on a spindle 11 supported in a bracket 12 movable on sets of linear bearing rollers 13. Each set of rollers 13 runs in opposed complementary linear races 14, 15 (Figure 5) the latter being fixed in a longitudinally slidable arm 16 so that the bracket 12 can move normal to the datum plane 3. The arm 16 lies parallel to the datum plane, and is inclined towards the periphery of the wheel 1 at the same angle to the horizontal as the line X—Y of Figure 5 which passes through the axis 6 and through the point on the wheel where it is tangential to the horizontal, so that the said axis 6 can be moved bodily along the line X—Y whilst remaining at the same spacing from the wheel periphery and on the same wheel diameter despite any progressive reductions in wheel diameter as a result of working or truing operations when the wheel is grinding, say, bevel gear teeth.

Since the wheel 1 will normally advance into the work transversely of the axis 6 to compensate for diameter reductions, the position of the arm 16 can readily be controlled from the setting slide carrying the wheel retracting slide. As shown in Figure 5, the arm 16 has a triangular control lug 17 integral therewith or secured thereto, the operative edge 18 of this lug extending upwards at right angles to the direction XY of the arm and having a recess 19 to accommodate a bearing roller 20. This roller also runs in a groove 21 on a parallel projection 22 on the wheel setting slide 23. Thus, provided that the guideway (indicated at 16a in Figure 5) for the arm 16 is fixed relative to the position of the work in, say, a bevel gear grinding machine, the arm 16 will advance longitudinally with each advance of the wheel setting slide 23 as it compensates for progressive reductions in the wheel diameter, this advance of the arm being always in the correct ratio to ensure accurate location of the axis 6.

Oscillatory motion of the tool carrier 5 is controlled by a Bowden cable 50 (Figure 6) acting against a spiral spring 51 (Figure 4) whose one end is anchored to the spindle 11 whilst the other end is anchored to the carrier 5. The latter carries a pair of stop pins 24 (Figure 3) which are alternatively engageable with a fixed stop 25 to define the limit of traverse of either tool 4a, 4b across the face of the wheel 1. The tools 4a, 4b across the face of the wheel 1. The tools 4a, 4b are clamped in split lugs 26, 27 respectively, whilst the locating pegs 9a, 9b are locked by screws as at 28. The register plate 10 (Figures 3 and 9) is arcuate about the axis 6, and hence must move therewith. It is accordingly mounted on a bracket 29 which is fixed to, or constitutes part of, the arm 16.

The mounting for the tool carrier 5 is shown in more detail in Figures 6, 7 and 8, the carrier being omitted in Figures 7 and 8 for clarity of illustration. The bracket 12 is integral with a saddle 12a which is slidable on the bearings 14 on a support 53 bolted to the arm 16. Tension springs 54 are anchored at their one ends to pins 55 (Figure 8) on the arm 16 and at their other ends to pins 56 on the saddle 12a and urge the tool carrier bracket 12 towards the datum plate 10 so as to maintain the locating pegs 9a, 9b in firm contact therewith. The axis PQ of Figure 7 shows the position of the spindle 11 when the tool carrier 5 is mounted on the bracket 12.

The carrier 5 consists of two parts 57, 58 (Figure 4) clamped together by nuts 59, 60 on the shaft 11, and both keyed thereto at 61, 62 respectively. The Bowden cable 50 passes round the circumference of the carrier part 58 and is anchored at 63 (Figure 6), the ferrule 64 for the outer sheath 50a of the cable (Figure 6) being screwed into a cheek plate 65 on the saddle 12a. The shaft 11 rotates in bearings 66, 67 (Figure 4) in an adaptor 68 bolted to the bracket 12. Rotation in one direction is effected by the Bowden cable 50 against the spring 51 and in the other by the spring. Figure 4 also shows the relative positions of the tool carrier 5 and the wheel 1 when the latter is new (shown at 1a) and when it is ready for replacement (shown at 1b).

Figure 10:
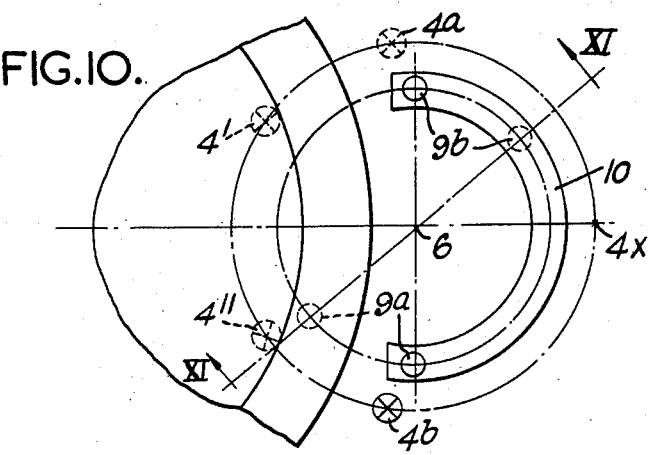
Figure 10 is a schematic elevation similar to Figure 1, of a modified device using only one diamond truing tool.
Figure 11:
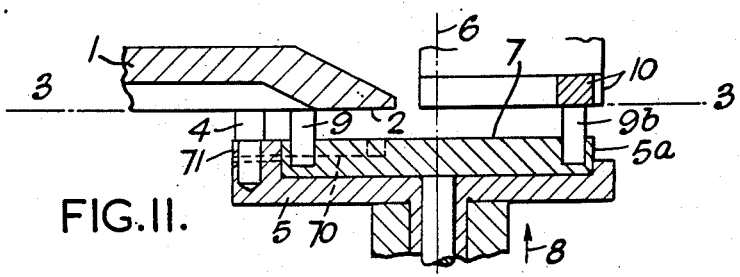
Figure 11 is a fragmentary section on the line XI—XI of Figure 10.
Figure 12:
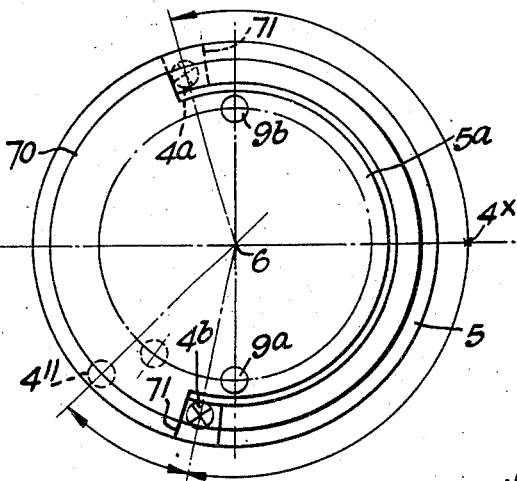
Figure 12 is an elevation, seen in the opposite direction from Figure 10, and with the wheel and register plate removed.

Figures 10–12 show a modification of the construction illustrated in Figures 1–9. The modification consists in using only one diamond tool 4 which can occupy either of two zero positions at 4a, 4b (Figures 10 and 12).

The diamond tool 4 is clamped in a disc-like rotary carrier 5 (Figure 11) which is rotatable about the axis 6 through an angle less than 360° by an amount which permits the tool 4 to clear the radially inward edge of the wheel face 2, at the wear-down limit of the latter, after a truing stroke starting from either of the positions 4a and 4b. These clearance positions are indicated at 4' and 4" in Figure 10. The carrier 5 is recessed on its front face to accommodate a disc-like locating peg mounting block 5a. The peg block 5a is rotatable about the axis 6 through an angle less by approximately 180° than that of the tool carrier 5.

The peg block 5a has a part-circumferential lug 70 (Figure 11) extending radially therefrom over an arc substantially opposite to the arcuate register plate 10, whilst the diamond tool 4 is mounted in an upstanding abutment 71 whose opposite sides are alternately engageable with the ends of the lug 70. The peg block 5a is spring-loaded to a central or zero position in which the locating pegs 9a, 9b are both in engagement with the arcuate register plate 10, as indicated in full lines in Figures 10 and 12.

The tool carrier 5 is oscillated between the limit positions represented at 4' and 4" in Figure 10 through the point 4x by a driving mechanism (not shown) which may be arranged to move the tool 4 over the idle arc between the positions 4a and 4b at a greater speed than between the positions 4a and 4' or 4b and 4", respectively. When the tool carrier 5 is moved from the position 4b to the position 4" the abutment 71 engages the adjacent end of the lug 70 on the peg block 5a and carries it round, thus causing the locating peg 9a to traverse the trued surface 2 of the grinding wheel 1. On the return stroke, the spring loading mechanism on the peg block 5a causes the latter to follow up the tool carrier 5 until it reaches the zero position. Thereafter, the peg block 5a remains stationary until the abutment 71 engages the other end of the lug 70—i. e. when the tool 4 reaches the position 4a. Continued rotation of the tool carrier 5 now swings the peg block 5a in the other direction to cause the other peg 9b to traverse the trued face 2.

The intermittent oscillations of the peg block 5a are repeated at each end of each partial rotation of the tool carrier 5. In each truing stroke of the tool 4, its working tip is accurately located in the plane 3 by the engagement of one or other peg 9a, 9b with the register plate 10, as described with reference to Figures 1–9. The relative angular displacement of the tool 4 and the pegs 9a, 9b when the former is in either position 4a, 4b is such that the tool engages the surface 2 before the peg which follows it thereacross, so that the latter is always in contact with a zone of the surface which has just been trued.

Figure 13:
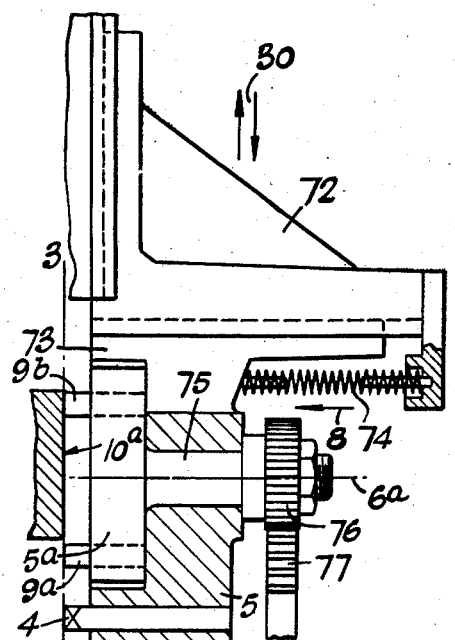
Figure 13 is a section similar to Figure 11 through a truing tool assembly for linear traverse of the tool across the conical surface of a V-slide grinding wheel.

Figure 13 shows a linear traverse tool assembly having a single diamond tool 4 and a pair of alternately operative locating pegs 9a, 9b each engageable in turn with a single straight register plate 10a. In this case, a conical wheel 1 is shown which is to have its conical surface 2' trued along a generatrix of the cone by the tool 4. The tool carrier 5 is reciprocable on a conventional slide mechanism 72 in the direction of the arrows 30, and supports a rotatable peg block 5a. The latter carries the two pegs 9a, 9b so that they are normally collinear with the diamond tool 4, as shown in the drawing. Both the tool carrier 5 and the peg block 5a are mounted on a subsidiary cross-slide 73 reciprocable on the main slide 72 in the direction of the axis 6a about which the block 5a is rotatable. The cross-slide 73 is biased in the direction of the arrow 8 by a compression spring 74 to urge the pegs 9a, 9b into contact with the register plate 10a. The peg block 5a is journalled in the tool carrier 5 by a stub shaft 75 which projects through the tool carrier and has a spur gear 76 secured thereto. The spur gear meshes with a rack 77 reciprocable on the tool carrier 5 for oscillating the peg block 5a through 180°.

The register plate 10a has its locating surface lying in a plane 3 which is tangential to the desired profile of the face 2' of the conical wheel 1 and constitutes the datum plane. Since the locating pegs 9a, 9b will be machined concave by the wheel 1, the locating surface of the register plate 10a may, if desired, be convex towards the pegs 9a, 9b at a radius not greater than the wear-down limit radius of the larger diameter edge of the conical face 2'. The pegs 9a, 9b will thus have line contact with the locating surface along the generatrix of the conical face 2' which lies in the datum plane 3. By this means, errors due to the variation in concavity of the machined ends of the pegs 9a, 9b as the wheel 1 wears down are eliminated.

The wheel 1 is trued by reciprocation of the diamond truing tool 4 across the wheel face 2' in the direction of the said generatrix between the position shown in full lines and the position shown dotted at 4'. During each truing stroke, one of the pegs 9a, 9b will be in contact with the register plate 10a whilst the other follows the diamond tool 4 across the trued face 2'. Between successive to-and-fro truing strokes of the tool 4, however, the peg block 5a is first retracted on the axis 6a to disengage the one peg from the register plate, then rotated through 180°, and then advanced to engage the other peg with it. The register plate 10a is located and dimensioned so that, during a truing stroke, it is engaged only by the locating peg further removed from the tool 4. In the arrangement shown, the operative locating peg is the peg 9b if the tool 4 is about to make its truing stroke, whilst the peg 9a is machined by the trued wheel surface 2'. On the successive truing cycle, the pegs 9a, 9b will be interchanged, and so on.

Figure 14:
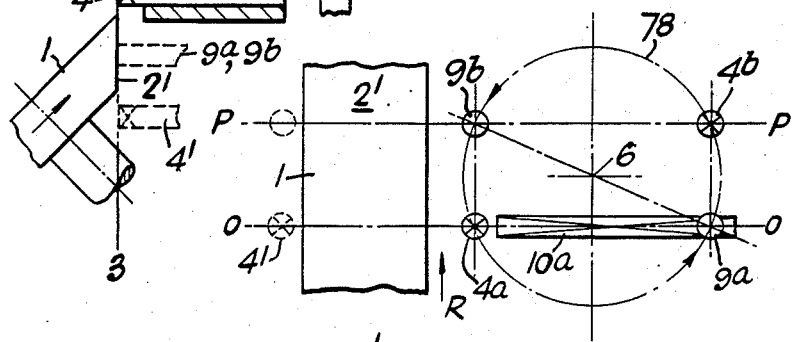

Figure 14 shows an arrangement for truing the cylindrical surface 2" of a grinding wheel 1. In this figure, two truing tools 4a, 4b are shown both of which are mounted in a common carrier (not shown) rotatable about the axis 6 and in which are also mounted the locating tools or pegs 9a, 9b. The axis of the wheel 1 lies in a plane which meets the datum plane (i. e. the plane of the figure) in the line P—P. The axis 6 is offset slightly from this line, and is parallel to the plane containing the line P—P and the wheel axis. The truing tools 4a, 4b are located at the opposite ends of a diameter whilst the locating pegs 9a, 9b are located at opposite ends of a different diameter, and all lie on a common pitch circle 78. The register plate 10a lies in the datum plane on an axis O—O, parallel to the truing axis P—P, and is so dimensioned that when a diamond truing tool is in the position 4a at the beginning or end of a truing stroke, the tool does not engage the register plate, although it is collinear with the centre-line O—O of the plate. At the same time, the appropriate locating peg 9a is in engagement with the register plate, the locating surface of which is preferably convex towards the pegs about an axis parallel to the datum plane and the axis O—O, the radius of curvature being not greater than the minimum wear-down radius of the wheel 1. The other truing tool 4b and locating peb 9b lie on the truing axis P—P. The distance between the two axes O—O and P—P is exaggerated in Figure 5 for the purposes of illustration only. The direction of rotation of the wheel 1 is shown by the arrow R.

In operation, the tool carrier is locked during each truing stroke so that as the tool 4a is traversed across the face 2" to be trued, the idle locating peg 9b moves with it to be machined in the datum plane to the extent of the wear on the truing tool. When the parts have returned to the positions shown in full lines, the tool carrier is retracted slightly from the datum plane along the axis 6 and indexed through 180°; it is then advanced to bring the other locating peg 9b into engagement with the register plate 10a and the other tool 4b into the position shown at 4a. The next truing cycle is then executed, and the carrier is again rotated through 180°, and so on.

Figure 15:
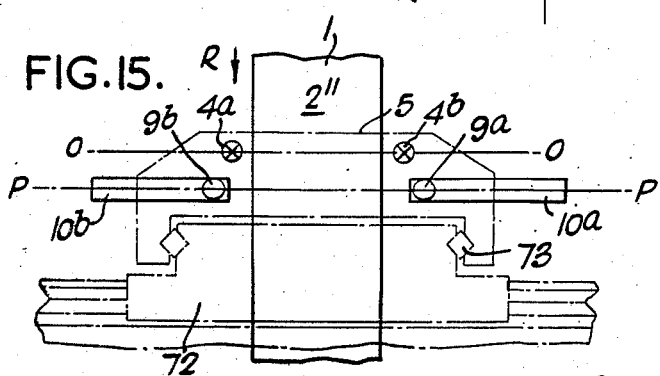

Figure 15 shows an alternative arrangement of diamond tools 4a, 4b, and locating pegs 9a, 9b, the locating pegs moving along the generatrix of the wheel face 2" lying in the datum plane so that the diamond tools 4a, 4b move parallel thereto but offset therefrom by a short distance sufficient to enable the idle tool on any one truing stroke to avoid the adjacent register plate. The locating pegs 9a, 9b engage respective register plates 10a, 10b, one on either side of the wheel 1, whose locating surfaces lie in or are tangential to the datum plane. The locating surfaces of the register plates may be flat, but are preferably convex towards the locating pegs with a radius not greater than the minimum radius down to which the wheel 1 will be trued before replacement, the convex surfaces being struck about the axis of rotation of the wheel.

The carrier 5 is biased to hold the locating pegs 9a, 9b in contact with the register plates 10a, 10b respectively and the whole tool and register plate assembly may, if desired, be mounted for displacement towards the wheel 1 for accommodating diameter reductions, as in the case of the previous arrangement of arm 16 described with reference to Figures 3–9. The carrier 5 is reciprocated linearly, as in the embodiment shown in Figure 13, on slides 72 and 73, the fromer controlling the truing traverse and the latter the in-feed of the tools 4a, 4b and locating pegs 9a, 9b.

As previously indicated, the tools 4a, 4b may themselves perform the functions of the locating pegs 9a, 9b, in which case the latter are dispensed with and the datum plate 10 is of a very hard material, such as tungsten carbide or nitrided steel, and its radius or, if straight, its location is such that either tool will engage its locating surface whilst the other is being traversed across the wheel face 2 to true it.

Figure 16 shows one such simplified arrangement of linear traverse assembly, the tool carrier 5 having two diamond tools 4a, 4b only, and being rotatable about an axis 6a to interchange the tools between each truing stroke so that each alternately trues the wheel 1 and locates the other. Whilst this arrangement is simple, it has the drawback that, unless the tools are initially set up with their working tips very accurately co-planar, self-compensation is very slow due to the slow rate of wear of the tools. The initially proud tool will take a heavier cut than the other until it has worn to the same level, whereafter self-compensation for wear proceeds as in previous embodiments.

In order to avoid this difficulty, one of the tools could be replaced by a machinable locating tool, the carrier 5 being then required to make two traverses—first a wheel truing traverse with the diamond tool located by the locating peg, and then a machining traverse with the locating peg located by the diamond. Such an arrangement takes twice as long to complete one cycle of operation.

Figure 17 shows the counterpart of Figure 16 for use in dressing the flat face of a wheel. Here again, the same requirement of high accuracy in initial setting up is called for.

Furthermore, in both Figures 16 and 17, the locating surface of the register plate 10 is engaged by a diamond tool, and higher rate of wear of the plate could be expected than in those constructions in which the register plate is engaged only by the locating tool.

From the foregoing description it will be seen that the cutting tip of a diamond truing tool is always located during a truing stroke by a fixed register surface which is engaged by another tool, which can be either another and alternately operative truing tool or a separate locating peg and whose locating face is regularly traversed across the grinding wheel. Hence, the device is largely—if not wholly—self-compensating for tool wear. Such self-compensation is improved where separate locating pegs are employed since these are machined, prior to engagement with the register plate, by a grinding surface immediately after the latter has itself been trued by a diamond tool. In all such cases, also, any initial proud setting of the pegs 9a, 9b with respect to the diamond tool or tools is compensated after the first traverse across the trued grinding face.

If the diamond tools 4a, 4b are initially set the one slightly proud of the other, then only the truing strokes of the proud tool will be operative until it has been worn down flush with the other. This is because each tool is located by the peg which follows the other tool across the trued face. Whilst this may lead to the wheel face being trued only once in every two truing operations, it must be borne in mind that the initial setting error will normally be very small indeed, and further that there will normally be a large factor of safety in the selection of the number of truing operations with respect to the amount of work required of the wheel.

Both the locating tools or pegs and the register surfaces will normally be of hardened steel, though other materials may be selected if preferred.

I claim:

1. A diamond truing device for a grinding machine having a grinding wheel bodily displaceable therein for taking up wear of the wheel comprising a diamond tool carrier; a diamond tool secured in the carrier; another tool secured in the carrier with its tip substantially coplanar with the tip of said diamond tool; means for traversing said diamond tool and said other tool in turn across the wheel face; a register member fixed with respect to the bodily displacement of the wheel and having a plane locating surface lying in and defining a datum plane with respect to which the wheel is to be trued; and means operative on said carrier for maintaining contact between said other tool and said locating surface of the register member during traverse of said diamond tool across the wheel face.

2. A diamond truing device according to claim 1 wherein the tool carrier has two locating tools of a material machinable by the wheel, the said tools being located so that each is traversible across the wheel surface on alternate truing strokes of the device whilst the other is operative to locate it and the working diamond tool, and vice versa.

3. A diamond truing device according to claim 2 wherein the tool carrier is linearly reciprocable parallel to a generatrix in the datum plane of the trued face of the wheel during a truing stroke.

4. A diamond truing device according to claim 2 having a single diamond truing tool, the two locating tools being mounted in a common block which is rotatable with respect to the tool carrier about an axis normal to the locating surface between successive truing strokes of the diamond tool so as to render each locating tool alternately operative to locate the diamond tool whilst the other locating tool is being machined by a trued zone of the wheel face, and vice versa.

5. A diamond truing device according to claim 4 wherein the tool carrier is itself oscillatable through an angle greater than 180° about the same axis as the locating tool block and has a lost motion connection therewith, the locating tool block being biased to a zero position in which neither locating tool is in contact with the wheel but engageable by the tool carrier during the latter part of each half cycle of oscillation thereof, whereby each locating tool is in turn caused to follow the diamond tool across the trued face of the wheel whilst the other locating tool is being traversed in engagement with the locating surface of the register member.

6. A diamond truing device according to claim 5 wherein the tool carrier and the locating tool block are constituted by concentric discs, the tool carrier having a single diamond tool mounted close to its periphery in an upstanding abutment whilst the locating tool block has coacting radial faces engageable by the abutment.

7. A diamond truing tool according to claim 6 wherein the locating tools are diametrically opposite each other at the same radius from the common centre of the discs, and the diamond tool is set at a greater radius.

8. A diamond truing device according to claim 7 wherein the register member is arcuate with a maximum radius less than the minimum radius of the path swept by the diamond tool.

9. A diamond truing device according to claim 8 wherein the register member is of circular segmental shape struck about the common axis of the concentric discs, the ends of the segment lying close to the edge of the wheel face to be trued.

10. In a grinding machine having a diamond truing device for dressing a surface of the grinding wheel or like abrading tool, a fixed register member having a locating surface lying in and defining a fixed datum plane with respect to which the wheel is to be dressed; a tool carrier; a diamond truing tool secured in the carrier with its working tip projecting towards the datum plane; at least one other tool secured in the carrier with its working tip similarly projecting towards the datum plane; means for moving the carrier so as to traverse the working tip of the diamond tool across the wheel surface to be trued whilst the working tip of the other tool is in locating contact with the said locating surface, and then to traverse the said other tool across the trued wheel surface prior to its next locating operation whilst its working tip is similarly located by a tool in contact with the said locating surface, and means for biasing the tool carrier to maintain firm contact between a locating tool and the locating surface.

11. In a grinding machine having a diamond truing device for dressing a surface of the grinding wheel or like abrading tool, a rigid register member fixedly mounted close to the said wheel and having a locating surface lying in and defining a fixed datum plane with respect to which the wheel surface is to be trued, a movable tool carrier, at least one diamond tool secured in the said tool carrier with its working tip projecting towards the datum plane, a pair of locating tools also secured in the said tool carrier with their working tips projecting towards the datum plane and substantially coplanar with the working tip of the diamond tool, means for moving the tool carrier to traverse said diamond tool in a truing stroke across the wheel face, means for biasing the tool carrier so as to maintain firm contact between the working tip of at least one locating tool and the said locating surface during a truing stroke of said diamond tool, and means for alternating the positions of the locating tools so that each is in turn first traversed with said diamond tool across the freshly trued face of the wheel and then along and in contact with the said locating surface during the next diamond truing stroke.

12. A diamond truing device according to claim 11 comprising a single diamond tool mounted in the tool carrier and two locating tools mounted in a separate block rotatably supported in the tool carrier for rotation relatively thereto about an axis normal to the datum plane, means for moving the tool carrier and the said block so as to traverse the diamond tool and one locating tool across the face of the wheel and means for effecting relative rotation between the said block and the tool carrier to interchange the locating tools between successive truing strokes of the diamond tool.

13. A diamond truing device for truing a plane face of a grinding wheel or the like comprising a register member having a fixed locating surface lying in and defining a datum plane normal to the axis of rotation of the wheel and with respect to which the wheel face is to be trued, a tool carrier rotatable about an axis normal to the datum plane and close to the wheel, a pair of diamond tools secured in the carrier at the same radius from but on opposite sides of the said axes and projecting towards the datum plane, a pair of locating tools similarly secured in the carrier at a different common radius from the said axis of carrier rotation, all the said tools having their working tips coplanar and the locating surface being positioned for engagement by the locating tools only, drive means for oscillating the carrier so as to traverse one diamond tool and one locating tool alternately with the other diamond tool and the other locating tool across the said wheel face, each diamond tool having its working tip located in the datum plane by engagement of the opposite locating tool with the locating surface of the register member.

14. A diamond truing device for truing a plane face of a grinding wheel or the like comprising a register member having a locating surface lying in and defining a datum plane normal to the axis of rotation of the wheel and with respect to which the wheel is to be trued, a tool carrier, a pair of diamond tools secured in the carrier at opposite sides thereof and a pair of locating tools similarly secured in the tool carrier at opposite sides thereof, all the tools having their working tips coplanar whilst the locating surface is positioned for engagement by the locating tools only, means for displacing the carrier so as to traverse one diamond tool and one locating tool alternately with the other tools across the wheel face to be trued, each diamond tool having its working tip located in the datum plane during a truing stroke by engagement with said locating surface of the locating tool not being traversed across the wheel face.

15. A diamond truing device according to claim 14 wherein the tool carrier is rotatable about an axis normal to the datum plane and close to the wheel, and the diamond tools are secured therein on a pitch circle of different diameter from that on which the locating tools are secured.

16. A diamond truing device according to claim 14 wherein the tool carrier is linearly displaceable past the wheel face to be trued and one diamond tool and one locating tool are secured therein on one side of the said face to be trued and the other diamond tool and locating tool are secured therein on the other side of the said face.

17. In a grinding machine having a diamond truing device for truing a working face of a grinding wheel on the machine, a rigid register member having a locating surface lying in and defining a datum plane which constitutes a fixed design parameter of the machine and with respect to which the wheel face is to be trued, a tool carrier, at least two tools secured in the carrier with their working tips coplanar and projecting towards the datum plane, means for displacing the tool carrier so as to traverse each tool in turn across the wheel face, and means for maintaining the other tool in contact with the locating surface of the register member during said traverse.

18. In a grinding machine having a grinding wheel, a face of which is to be trued, a diamond truing device comprising a rigid register member having a locating surface lying in and defining a fixed datum plane in the machine, with respect to which the wheel face is to be trued; a tool carrier; a diamond tool and at least two locating tools mounted in the carrier with their tips flush with each other; means for moving the carrier so that the diamond tool and at least one locating tool traverse the face of the wheel while at least one other locating tool is maintained in engagement with the locating surface, the locating tools and the locating surface being positioned out of the path of a diamond tool so that the latter does not make contact with the locating surface.

19. In a grinding machine having a diamond truing device for truing a working face of a grinding wheel on the machine, a register member having an arcuate locating surface lying in and defining a fixed datum plane with respect to which the wheel face is to be trued, a tool carrier rotatably mounted for oscillation about an axis normal to the datum plane and containing the centre of curvature of the arcuate locating surface; a pair of diamond truing tools clamped in the said tool carrier at equal radii from the axis and with their working tips projecting towards the datum plane, a pair of locating tools clamped in the carrier at another common radius from the axis, spring means for biasing the carrier towards the register member, and means for oscillating the carrier so that a diamond tool and a locating tool are traversed to and fro across the wheel face to be trued while the other locating tool moves over the locating surface in continuous contact therewith.

20. In a grinding machine, a grinding wheel having a plane face to be trued to a fixed datum plane in the machine; a fixed register member having an arcuate locating surface lying permanently in said datum plane; a tool carrier rotatable about an axis normal to the datum plane and containing the centre of curvature of said arcuate locating surface; at least one diamond tool mounted on said carrier at a radius different from that of said arcuate locating surface; at least two locating tools mounted at angular spacings on said carrier at the same radius as the arcuate locating surface, said diamond and locating tools having their tips flush with each other; means acting on the carrier for maintaining a locating tool in contact with the locating surface, said locating surface subtending an angle not less than that necessary to ensure continuous engagement by a locating tool; and means for rotating the carrier about its axis to traverse a diamond tool and a locating tool across the wheel face to be trued.

21. In a bevel gear grinding machine having a tool slide for guiding the grinding wheel, a face of which is to be trued for machining a tooth flank on a bevel gear blank, and means adapted to feed said wheel into the work as the periphery of said wheel wears down, a register member fixedly supported on said slide and having a locating surface lying permanently in a datum plane which includes the line of contact of the wheel face to be trued and a tooth flank on the gear blank; a tool carrier mounted for movement in a plane parallel to said locating surface; at least three tools secured in said carrier, at least one of which is a diamond tool and two others are locating tools; said tools having their working tips flush with each other; means for urging said tool carrier towards said register member so as to maintain at least one locating tool in contact with said locating surface; and means for traversing said diamond tool and alternate locating tools across the wheel face whilst the other locating tool is in contact with the locating surface.

References Cited in the file of this patent

UNITED STATES PATENTS

| | | |
|---|---|---|
| 1,832,684 | Bath | Nov. 17, 1931 |

FOREIGN PATENTS

| | | |
|---|---|---|
| 475,096 | Great Britain | Nov. 8, 1937 |
| 733,738 | Germany | Apr. 1, 1943 |
| 738,047 | Germany | July 31, 1943 |
| 738,048 | Germany | July 31, 1943 |